United States Patent [19]

Valis

[11] 3,930,199

[45] Dec. 30, 1975

[54] MEANS FOR DETERMINING FREQUENCY

[75] Inventor: Jaroslav Valis, Vasteras, Sweden

[73] Assignee: Allmanna Svenska Elektriska Aktiebolaget, Vasteras, Sweden

[22] Filed: Dec. 31, 1974

[21] Appl. No.: 537,782

[30] Foreign Application Priority Data
Feb. 7, 1974 Sweden.............................. 7401611

[52] U.S. Cl................ 324/78 D; 235/194; 324/83 D
[51] Int. Cl.²......................................... G01R 23/02
[58] Field of Search ............ 235/194; 324/166, 186, 324/187, 77 D, 79 D, 83 D; 332/9; 307/269

[56] References Cited
UNITED STATES PATENTS
3,445,643  5/1969  Schmoock ......................... 235/194
3,895,294  7/1975  Vinding ............................. 324/83 D Primary Examiner—R. V. Rolinec
Assistant Examiner—Michael J. Tokar

[57] ABSTRACT

An arrangement for measuring frequency includes a counter unit and two multipliers connected in series with each other to the counter unit. A sensing unit senses each pulse in an unknown pulse train, the frequency of which is to be determined. The multipliers form a second pulse train, the frequency of which is proportional to the square of the content of the counter unit. The counter unit reduces its content by a predetermined amount for each pulse in the second pulse train. The sensing unit delivers a third pulse train to the counter unit, which causes the counter unit to preset its content to a predetermined maximum quantity. The content of the counter unit at the time of each pulse in the first pulse train indicates the frequency of the first pulse train.

7 Claims, 2 Drawing Figures

MEANS FOR DETERMINING FREQUENCY

BACKGROUND OF THE INVENTION

Field of the Invention

The present invention relates to a means for determining a frequency.

Digital measuring of the speed of revolutions is usually carried out by methods which are based on speed/frequency conversion by means of a pulse emitter mounted, for example, on an engine shaft, said pulse emitter generating a certain number of pulses per revolution, the output frequency being proportional to the number of revolutions. The frequency is then converted into numbers which are represented by a certain content in a counter unit. After counting up once, the contents of the counter unit are a direct measure of the speed.

A method like this involves a high resolution, accuracy of measurement, and a high time and temperature stability because of a crystal-controlled time basis.

In order to obtain a resolution of, say, 0.1 percent by means of such a method, 10,000 measuring pulses must be counted at full speed. If the pulse emitter operates at 10 kHz at this speed, the time of counting will be 1 second.

For control purposes, this measurement time is far too long since a step change of te measured frequency in the worst case is not indicated until after two measuring periods, that is, after 2 seconds. For control purposes a counting time which amounts to about 20 milliseconds is often required. A speed measurement which is performed according to the method described above must be complemented with a similar DC tacho-generator equipment for such applications, which makes the method complicated and expensive.

SUMMARY OF THE INVENTION

With a means for determining frequency according to the present invention, a speed measurement can be performed with the desired rapidity at the high resolution desired by using a novel combination of available standard components.

Such an arrangement for measuring frequency includes a counter unit and two multipliers connected in series with each other to the counter unit. A sensing means senses each pulse in an unknown pulse train, the frequency of which is to be determined, while the multipliers include means to form a second pulse train, the frequency of which is proportional to the square of the content of the counter unit. The counter unit includes means to reduce its content by a predetermined amount for each pulse in the second pulse train. The sensing means delivers a third pulse train to the counter unit, which causes the counter unit to preset its content to a predetermined maximum quantity, so that the content of the counter unit at the time of each pulse in the first pulse train corresponds to the frequency of the first pulse train.

The device according to the invention will be described more fully with reference to the accompanying drawings, in which FIG. 1 shows the principle of a device according to the invention and in which FIG. 2 shows in diagrammatic form the relations in a time plane between the signals occurring in the device.

DESCRIPTION OF THE PREFERRED EMBODIMENTS

Figure 1:
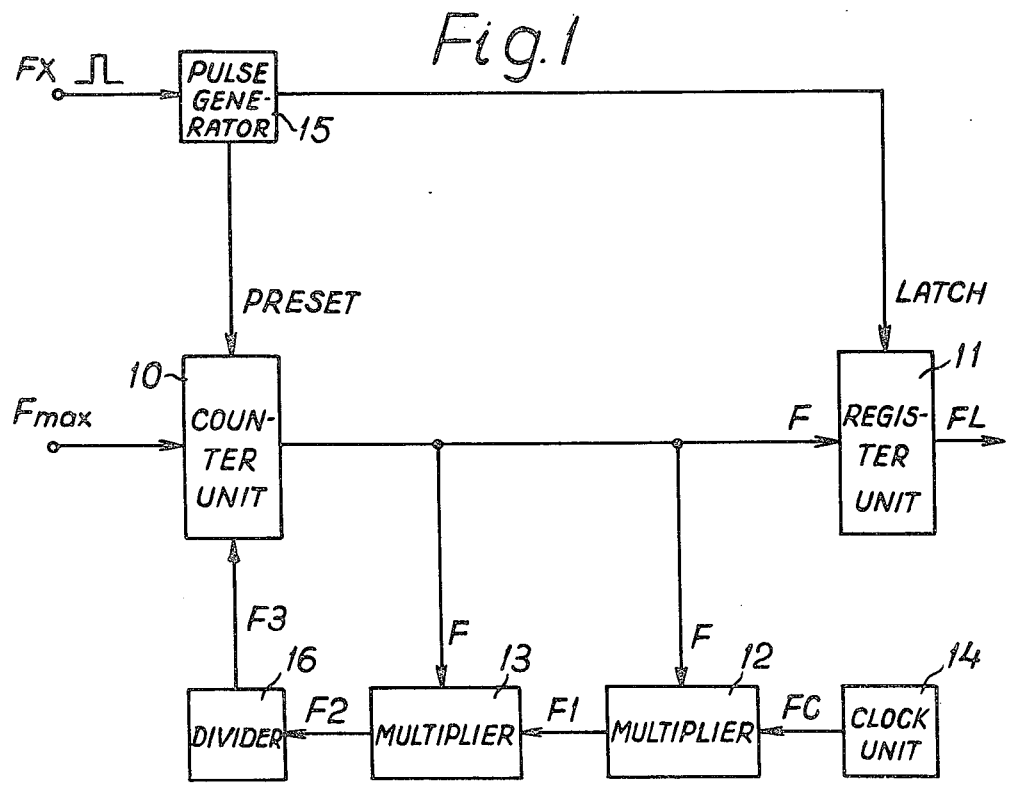

The device consists of a reversible counter unit 10 with preset possibilities, a register unit 11, two digital frequency multipliers 12 and 13, both having a proportionality factor 1/M, a clock unit 14, a pulse generator 15 and a frequency divider 16 having a proportionality factor 1/N.

The clock unit 14 generates a pulse train FC with a constant frequency $f_c$ which is supplied to the first multiplier 12, the output signal of which, a pulse train F1 with the frequecy $f_1$, is supplied to the second frequency multiplier 13. The output signal from the multiplier 13 consists of a pulse train F2 with the frequency $f_2$ which is supplied to the divider 16. The output signal from divider 16 consists of a pulse train F3 with the frequency $f_3$.

The content F of the counter unit 10 is a binary number or a BCD number in parallel form. For each pulse in the pulse train F3, the content F of the counter unit 10 is reduced by one unit.

The contents F are transferred to the two multipliers 12 and 13 and to the register unit 11. This means that the contents F of the counter unit 10 are reduced inversely proportionally to the time when the following applies:

$$f_1 = \frac{F}{M} \cdot f_c \qquad (1)$$

$$f_2 = \frac{F}{M} \cdot f_1 = \frac{F^2}{M^2} \cdot f_c \qquad (2)$$

and $$f_3 = \frac{f_2}{N} = \frac{F^2}{N \cdot M^2} \cdot f_c \qquad (3)$$

The contents F of the counter unit 10 will therefore be reduced by $f_3$ units per time unit, which can be expressed as $$\frac{dF}{dt} = -f_3 = -\frac{F^2}{N \cdot M^2} \cdot f_c \qquad (4)$$

This differential equation can be transcribed as $$-\frac{NM^2}{f_c} \int_{F(t_0)}^{F(t_x)} \frac{dF}{F^2} = \int_{t_0}^{t_x} dt$$

which has the solution $$F(t_x) = \frac{1}{\frac{1}{F(t_0)} + \frac{f_c}{NM^2}(t_x - t_0)} \qquad (5)$$

If the boundary condition is chosen to be $$F(t_0) = \frac{NM^2}{f_c} \cdot \frac{1}{t_0}$$

the following is obtained $$F(t_x) = \frac{NM^2}{f_c} \cdot \frac{1}{t_x} \qquad (6)$$

where $t_x = 1/f_x$, where $f_x$ is the frequency of the unknown pulse train FX which is supplied to the pulse generator 15.

Figure 2:
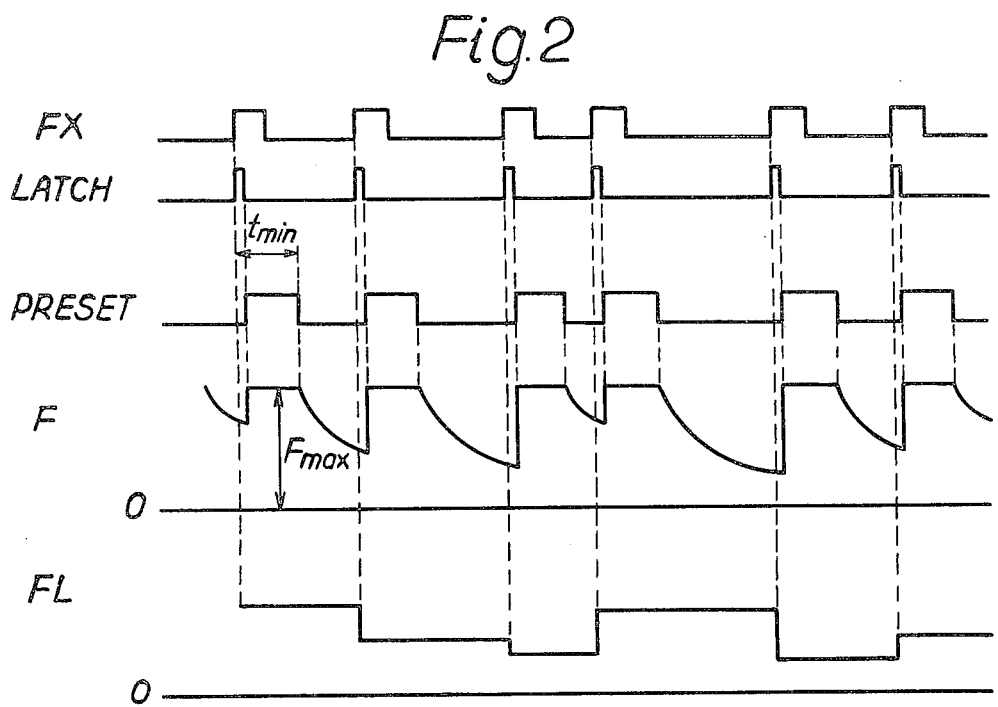

The frequency $f_x$ is now determined, as is clear from FIG. 2, by the fact that a. at the beginning of each pulse in the pulse train FX the pulse generator 15 generates a pulse LATCH to the register unit 11 which transmits the contents F present in the counter unit 10 at the time to the register unit 11;

b. when the pulse LATCH has ended the pulse generator 15 generates a pulse PRESET to the counter unit 10, which presets the contents F of the counter unit 10 to $$F_{max} = \frac{NM^2}{f_c} \cdot f_{xmax},$$

$f_{xmax}$ being the highest measurable frequency of the pulse train FX.

The contents $F_{max}$ of the counter unit 10 are then blocked during a time interval $$t_{min} = \frac{1}{f_{xmax}},$$

counting from the beginning of a pulse in the pulse train FX.

After this the counting down of the contents F of the counter unit 10 starts, and at the beginning of the next pulse in the pulse train FX, which appears after the time $$t_x = \frac{1}{f_x},$$

a repetition of what has been stated under a) and b) above takes place.

Immediately after each step a) according to the above, the contents $F_L$ of the register unit 11 will then, in accordance with the equation (6) above, be equal to $$F_L = \frac{NM^2}{f_c} \cdot \frac{1}{t_x} = \frac{NM^2}{f_c} \cdot f_x$$

that is, proportional to the unknown frequency $f_x$ of the pulse train FX.

Alternatively, the divider 16 can be excluded as this only entails a multiplication by a proportionality constant $1/N$ to adjust the pulse train $F_2$ to the counter unit 10.

As is clear from the above, the device according to the invention makes it possible to obtain the theoretical lower limit of measurement time, which limit is described by the period time $t_x$ of the measured frequency $f_x$.

To be able to measure frequencies at this measurement speed is important in several contexts, for example physical-medical frequency measurings, control of low speeds, speed indication by the Doppler principle and so on.

I claim:

1. Means for measuring frequency which comprises a counter unit (10), first and second multipliers (12,13) connected in series with each other, and connected to the counter unit, a sensing unit (15) including means for sensing each pulse in a first unknown pulse train (FX), the frequency ($f_x$) of which is to be determined, said multipliers (12,13) including means to generate a second pulse train (F2), the frequency of which is proportional to the square of the content (F) of the counter unit (10), the counter unit (10) including means responsive to each pulse in the second pulse train (F2) to reduce the content (F) of the counter unit by a predetermined quantity, the sensing unit (15) including means to deliver a third pulse train (PRESET) to the counter unit (10), the counter unit (10) including means responsive to each pulse in the third pulse train (PRESET) to preset the content (F) of the counter unit to a predetermined greatest quantity ($F_{max}$), the content (F) of the counter unit (10) at the time of each pulse in the first pulse train (FX) constituting a measure of the frequency ($f_x$) of the first pulse train.

2. Means according to claim 1, which comprises a clock unit means (14) to deliver a fourth pulse train (FC) with a known constant frequency ($f_c$) to one of the multipliers.

3. Means according to claim 2, in which the frequency ($f_2$) of said second pulse train (F2) is proportional to the frequency ($f_c$) of said fourth pulse train (FC).

4. Means according to claim 3, in which the first multiplier (12) includes means to form a fifth pulse train (F1) in dependence on the content (F) of the counter unit (10) and of the fourth pulse train (FC) and the frequency ($f_1$) of which is proportional to the frequency ($f_c$) of the fourth pulse train (FC).

5. Means according to claim 4, in which the second multiplier (13) includes means to form a sixth pulse train (F2) in dependence on the content (F) of the counter unit (10) and of the fifth pulse train (F1) and the frequency ($f_2$) of the fourth pulse train.

6. Means according to claim 5, in which the second pulse train (F2) is equal to the sixth pulse train (F2).

7. Means according to claim 1, in which the counter unit (10) includes means to start counting down its contents (F) only a time $$t_{min} = \frac{1}{f_{xmax}}$$

after the beginning of a pulse in the first pulse train (FX), $f_{xmax}$ being the highest measurable frequency ($f_x$) of the first pulse train (FX).

* * * * *